United States Patent
Chen et al.

(10) Patent No.: US 11,367,446 B2
(45) Date of Patent: Jun. 21, 2022

(54) INFORMATION DISSEMINATION SYSTEM AND METHOD THEREOF

(71) Applicant: Merry Electronics(Shenzhen) Co., Ltd., ShenZhen (CN)

(72) Inventors: Sheng Chen, Taichung (TW); Hao-Jun Zhang, Taichung (TW); Hung-Yu Chen, Taichung (TW); Mao-Hung Lin, Taichung (TW); Hung-Chi Lin, Taichung (TW)

(73) Assignee: Merry Electronics(Shenzhen) Co., Ltd., ShenZhen (CN)

( * ) Notice: Subject to any disclaimer, the term of this patent is extended or adjusted under 35 U.S.C. 154(b) by 276 days.

(21) Appl. No.: 16/889,820

(22) Filed: Jun. 2, 2020

(65) Prior Publication Data

US 2021/0304748 A1   Sep. 30, 2021

(30) Foreign Application Priority Data

Mar. 24, 2020  (TW) .................................. 109109772

(51) Int. Cl.
| | |
|---|---|
| *G10L 15/30* | (2013.01) |
| *G10L 15/22* | (2006.01) |
| *G06F 3/16* | (2006.01) |
| *G10L 15/18* | (2013.01) |

(52) U.S. Cl.
CPC .............. *G10L 15/22* (2013.01); *G06F 3/167* (2013.01); *G10L 15/1815* (2013.01); *G10L 15/1822* (2013.01); *G10L 15/30* (2013.01); *G10L 2015/223* (2013.01)

(58) Field of Classification Search
CPC . G10L 15/22; G10L 15/1815; G10L 15/1822; G10L 15/30; G10L 15/26; G10L 15/34; G10L 2015/223; G06F 3/167
See application file for complete search history.

(56) References Cited

U.S. PATENT DOCUMENTS

2003/0063717 A1* 4/2003 Holmes .................. H04M 1/27
                                                       379/88.04

\* cited by examiner

*Primary Examiner* — Abul K Azad
(74) *Attorney, Agent, or Firm* — JCIPRNET (57) ABSTRACT

The application provides an information dissemination system including a first electronic device and a router. The first electronic device receives a first sound signal and recognizes the first sound signal according to a speech recognition algorithm to generate a first address information and a first coded information content. The router is connected to a local area network to receive the first encoded information content and semantically parse the first encoded information content to produce a parsed result. The router sends the parsed result over local area network. The router determines whether the first address indicated by the first address information is in the local area network according to the first address information, so as to send the parsed result to at least a second electronic device corresponding to the first address.

20 Claims, 5 Drawing Sheets

INFORMATION DISSEMINATION SYSTEM AND METHOD THEREOF

CROSS-REFERENCE TO RELATED APPLICATION

This application claims the priority benefit of Taiwan patent application serial no. 109109772, filed on Mar. 24, 2020. The entirety of the above-mentioned patent application is hereby incorporated by reference here and made a part of this specification.

BACKGROUND

Technical Field

The disclosure relates to an information dissemination system, and in particular, to an information dissemination system that can perform sound recognition and semantic analysis on the local side.

Description of Related Art

Smart speakers can stream music of the music platform from mobile phones, tablets or computers to smart speakers through Bluetooth connection for playback. Smart speakers can also stream user audio to the cloud in real time, so that the audio will be semantically analyzed in the cloud according to Natural Language Processing (NLP), to control the IoT system. For example, user can issue commands to a smart speaker that is closer to the user, to control a smart speaker for broadcasting in another place. Smart speakers can stream audio to the cloud after receiving the audio of the user. Audio is converted to text file in the cloud, the text file is semantically analyzed and then converted to audio. At last, audio is downloaded in streaming manner from the cloud by the aforementioned smart speaker in another place for broadcasting.

Since the user's audio is semantically analyzed after being converted into a text file in the cloud, so the processing time of the audio in the cloud is longer. Besides, since the streaming technology is to make the data packet transmitted like a pipeline, therefore, it is necessary to use a high-speed and stable network for transmission. Moreover, the uploading and downloading of audio will take up more traffic. In other words, the use of smart speakers is limited by transmission speed, cloud processing time, and network stability.

Therefore, it is necessary to propose a solution with faster transmission speed, shorter cloud processing time, and less dependence on stable networks.

SUMMARY

The application provides an information dissemination system and method, with faster transmission speed and shorter cloud processing time, and the advantage of relatively small dependence on a stable network.

The information dissemination system of the application includes a first electronic device and a router. The first electronic device is used to receive a first sound signal and recognize the first sound signal according to a speech recognition algorithm, to generate a first address information and a first encoded information content. The router connected to the local area network (LAN) is used to receive the first encoded information content and perform semantic analysis on the first encoded information content to produce a parsed result. The router transmits the parsed result through the LAN. Wherein, the router determines whether a first address indicated by the first address information is in the LAN according to the first address information, so as to send the parsed result to at least one second electronic device corresponding to the first address.

The information dissemination system of the application includes a first electronic device and a router. The first electronic device is used to receive a first sound signal and recognize the first sound signal according to a speech recognition algorithm, to generate a first address information and a first encoded information content. The router is used to receive the first encoded information content and transmit the first encoded information content via a cloud system. The router connected to the LAN is used to perform semantic analysis on the first encoded information content to generate a parsed result. The router is used to send the parsed result through the cloud system. Wherein, the router determines whether a first address indicated by the first address information is beyond the scope of the LAN according to the first address information, so as to end the parsed result to at least one second electronic device corresponding to the first address via the cloud system.

The information dissemination method of the application includes: receiving a first sound signal by a first electronic device connected to a local area network (LAN), and recognizing the first sound signal according to the speech recognition algorithm, to generate a first address information and a first encoded information content; and receiving the first encoded information content and semantically analyzing the first encoded information content to generate a parsed result by a router connected to the LAN, and transmitting the parsed result through the LAN by the router. Wherein, the router determines whether a first address indicated by the first address information is in the LAN according to the first address information. When the router determines that the first address indicated by the first address information is in the local area network, and the router transmits the parsed result to at least one second electronic device corresponding to the first address.

Based on the above, the application can recognize the sound signal through the first electronic device with the speech recognition algorithm to generate the first encoded information content, and the router transmits the analysis result to the second electronic device after semantically analyzing the first encoded information content. Therefore, the application has faster transmission speed, shorter cloud processing time, and the advantage of less dependence on a stable network.

DESCRIPTION OF THE EMBODIMENTS

Figure 1:
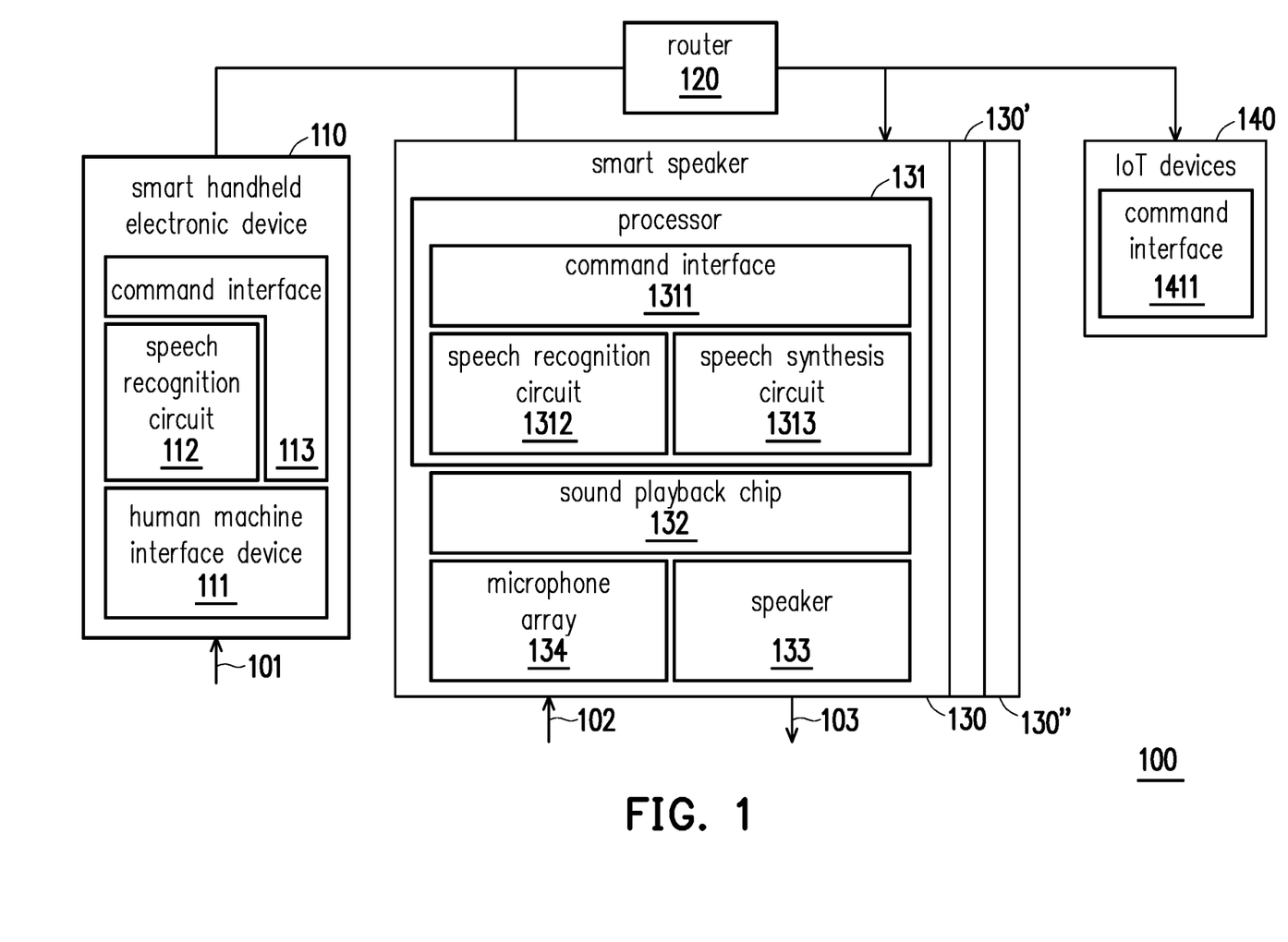
FIG. 1 is an architecture diagram of an information dissemination system according to an embodiment of the application.

FIG. 1 is an architecture diagram of an information dissemination system according to an embodiment of the application. Please referring to FIG. 1, the information dissemination system 100 mainly includes a smart handheld electronic device 110, a router 120, smart speakers 130, 130' and 130", and an Internet of Things (IoT) device 140. In the embodiment, the smart handheld electronic device 110 may be a smart phone, a tablet, a laptop or a desktop computer with computing capabilities. The IoT device 140 may be a smart home device, such as a smart door lock, a smart light or a smart air conditioner, etc.

The smart handheld electronic device 110 includes a Human-machine Interface Device (HID) 111, a speech recognition circuit 112, and a command interface 113. User communicates with the system through the HID 111 to input a sound signal 101. The speech recognition circuit 112 can recognize the sound signal 101 of the user according to a speech recognition algorithm (such as Speech to Text (STT)), and transmit the recognition result through the command interface 113. In detail, the speech recognition circuit 112 can cut the sound signal 101 with Mel-Frequency Cepstral Coefficients (MFCC) and feature extraction. Then, the speech recognition circuit 112 improves the signal length and amplitude mismatch problem through dynamic time warping and performs pattern comparison. The speech recognition circuit 112 searches for corresponding word from a corpus according to Gaussians Mixture Model (GMM) and predicts the words that may follow according to a probabilistic language model (such as N-gram). At last, the speech recognition circuit 112 uses Viterbi algorithm to find the most likely text string.

The smart handheld electronic device 110 can be directly connected to the router 120, or to a cloud (not shown) to find the router 120 corresponding to the address information and transmit the parsed result to the router 120. Wherein, the parsed result may contain an encoded information content in text form and an address information corresponding to a destination device.

The smart speaker 130 includes a processor 131, a sound playback chip 132, a speaker 133, and a microphone array 134. The processor 131 includes a command interface 1311, a speech recognition circuit 1312, and a speech synthesis circuit 1313. The structure of the smart speaker 130' and 130" is the same as the smart speaker 130, and will not repeat them here. The router 120 is used to receive the encoded information content and perform semantic analysis on the encoded information content (such as through Natural Language Processing (NLP) algorithm), so as to produce the parsed result. The router 120 is connected to a Local Area Network (LAN), and the router 120 routes and forwards the parsed result according to the address information (IP) of the destination device via the LAN. In the embodiment, the smart speakers 130, 130' and 130" are all within the scope of the aforementioned LAN.

In the embodiment, the router 120 can determine whether the address indicated by the address information is in the LAN or not according to the address information of the parsed result. If so, the router 120 transmits the parsed result to the smart speaker (such as smart speaker 130) corresponding to the aforementioned address. The text information content in the parsed result enters the speech synthesis circuit 1313 through the command interface 1311 of the processor 131 of the smart speaker 130, so as to generate synthesized speech corresponding to the encoded information content, i.e. simulated human sound. Wherein, the speech synthesis circuit 1313 may be a Text-To-Speech (TTS) system. Specifically, the speech synthesis circuit 1313 can perform text processing, then process the processing result with a statistical model (such as duration model and acoustic model), finally produce synthesized audio 103. And then, the synthesized audio 103 is played through the speaker 133. However, the application does not limit that only one smart speaker can broadcast. In other embodiment, the parsed result can contain address information of a plurality of the smart speakers 130, 130' and 130", so as to simultaneously broadcast the synthesized audio by the smart speakers 130, 130' and 130".

In another embodiment, the user can command the smart speaker 130 to play the specific song through the smart handheld electronic device 110. The smart handheld electronic device 110 can recognize the user's sound signal and transmit the parsed result to the router 120. Wherein, the parsed result for sound signals may contain the encoded information content corresponding to the aforementioned sound signals content and the address information corresponding to the smart speaker 130. The router 120 performs semantic analysis on the parsed result and transmits the parsed result to the smart speaker 130 corresponding to the aforementioned address information. The smart speaker 130 receives the parsed result and finds the corresponding audio on the local end according to the parsed result and broadcasts it. Such as, the smart speaker 130 can pre-store various songs for the user to order.

In another embodiment, the user can send a sound signal to the smart handheld electronic device 110, so as to start the IoT device 140 (such as smart lights). The smart handheld electronic device 110 can recognize on sound signals and transmit the parsed result to the router 120, wherein the parsed result can contain encoded information content corresponding to the aforementioned sound signal content and the address information corresponding to the IoT device 140. The router 120 performs semantic analysis on the parsed result and transmits the parsed result to the IoT device 140 corresponding to the aforementioned address information. The IoT device 140 receives the parsed result and performs startup action according to the parsed result through the command interface 1411. The user can also use similar methods to activate smart door lock, smart air conditioner, and other IoT device 140.

In the above embodiments, the smart handheld electronic device 110 (such as a smart phone) is used to recognize the sound signal. However, the application is not limited thereto. In other embodiment, the smart speakers 130, 130' or 130" can also performs sound signal recognition. For example, the smart speakers 130 can receive the sound signal 102 of the user through the microphone array 134. The speech recognition circuit 1312 of the smart speaker 130 can perform sound signal recognition and produce the corresponding encoded information content and the address information of the destination (such as smart speaker 130"). The parsed result including encoded information content and destination address information is transmitted to the router 120. The router 120 performs semantic analysis on the parsed result and transmits the parsed result to the smart speaker 130" corresponding to the aforementioned address information.

Figure 2:
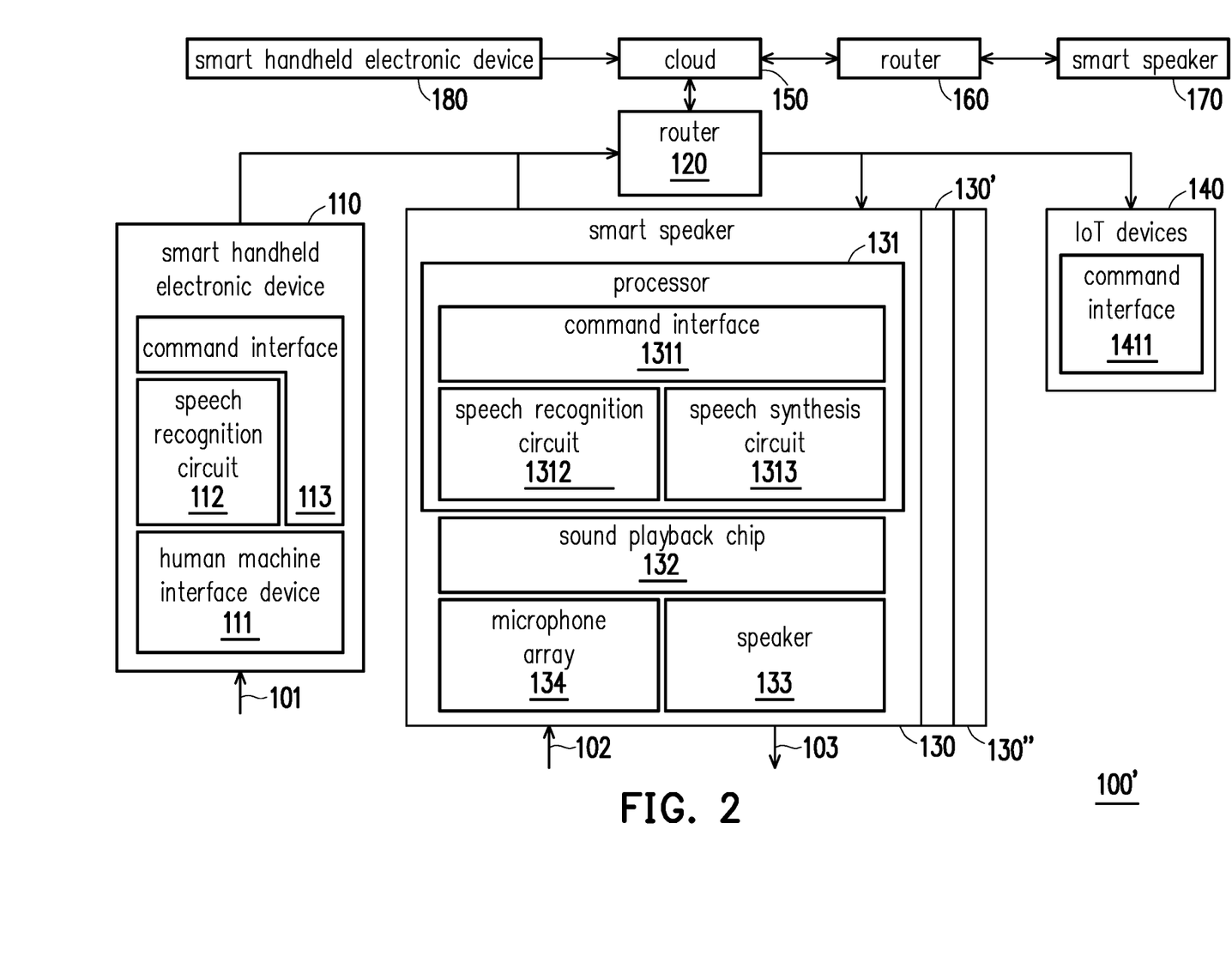
FIG. 2 is an architecture diagram of an information dissemination system according to an embodiment of the application.

FIG. 2 is an architecture diagram of an information dissemination system according to an embodiment of the application. Please referring to FIG. 2, the information dissemination system 100' mainly includes a smart handheld electronic device 110, a router 120, smart speakers 130, 130' and 130", an IoT device 140, cloud 150, a router 160, a smart speaker 170, and a smart handheld electronic device 180. Wherein, the related descriptions of the smart handheld electronic device 110, the router 120, the smart speakers 130, 130' and 130" and the IoT device 140 can refer to the smart handheld electronic device 110, the router 120, the smart speakers 130, 130' and 130" and the IoT device 140 of FIG. 1, and will not repeat them here.

The difference between the embodiment shown in FIG. 2 and the embodiment shown in FIG. 1 is that the information transmitting end and destination end of the embodiment shown in FIG. 1 are both within the scope of the LAN that the router 120 is responsible for, and the information transmitting end and destination end of the embodiment shown in FIG. 2 are located in different LANs respectively.

Please referring to FIG. 2, in an embodiment, the smart electronic device 110, the smart speakers 130, 130' and 130" can be used to recognize the sound signals. The smart electronic device 110, the smart speakers 130, 130' or 130" can receive and analyze user's sound signal according to speech recognition algorithm, so as to generate encoded information content in text form and the parsed result including the address information of the destination device. The router 120 further performs semantic analysis on the parsed result and transmits the parsed result to the destination device corresponding the aforementioned address information. The router 160 is connected to the LAN, and the router 120 determines whether the destination address indicated by the address information is beyond the scope of the LAN according to the address information of the aforementioned destination device. If the destination address is not beyond the scope of the LAN, the router 120 transmits the parsed result to the destination device in the LAN which is the same as the embodiment shown in FIG. 1. If the destination address is beyond the scope of the LAN, the router 120 transmits the parsed result to the destination device in another LAN through the cloud 150, such as smart speaker 170.

In another embodiment, the smart handheld electronic device 180 and the smart speaker 170 both can perform sound signal recognition. The smart electronic device 180 or the smart speaker 170 can receive the sound signal and recognize the user's sound signal according to the speech recognition algorithm, to generate the parsed result including the encoded information content and the address information of the destination end. In the example that the smart electronic device 180 performs a voice signal recognition, the smart handheld electronic device180 may be connected to the cloud 150 first, so as to find the router corresponding to the aforementioned address information and transmit the parsed result to the router (such as the router 160). The router 160 further performs semantic analysis on the parsed result and transmits the parsed result to the destination device corresponding to the aforementioned address information. The router 160 can determine whether the address information of the destination is in the local area network. If yes, the router 160 transmits the parsed result to the destination located in the LAN to which the router 160 belongs. If not, the router 160 transmits the parsed result via cloud 150 to the destination located in another LAN, such as smart speakers 130, 130', 130", or IoT device 140.

In the embodiment shown in FIG. 2, the smart handheld electronic device 110, 180, the smart speakers 130, 130', 130" or 170 can be used to receive and recognize the sound signals. Similarly, the destination device that transmits the parsed result may be the smart speakers 130, 130', 130", 170 or the IoT device 140, so as to perform the function corresponding to the parsed result by the destination device. In an embodiment, the destination end for sending the parsed result (such as the smart speaker 170) can perform the synthetic speech processing on the parsed result and broadcast it. In an embodiment, the destination end for sending the parsed result may be multiple smart speakers including smart speaker 170. The aforementioned smart speakers can receive the parsed results at the same time, and perform synthetic speech processing on the text information of the parsed result and broadcast it at the same time. In an embodiment, the destination end for sending the parsed result (such as smart speaker 170) can find the corresponding song (such as specific song) according to the parsed result via the destination end or the cloud 120 and broadcast it. In an embodiment, the destination end for sending the parsed result may be the IoT device 140, so as to enable the IoT device 140 to perform corresponding actions according to the parsed result, such as turn on smart light, smart door lock, or smart air conditioner. For the implementation details of the above multiple embodiments, refer to the description of the embodiment shown in FIG. 1, and will not repeat them here.

Figure 3:
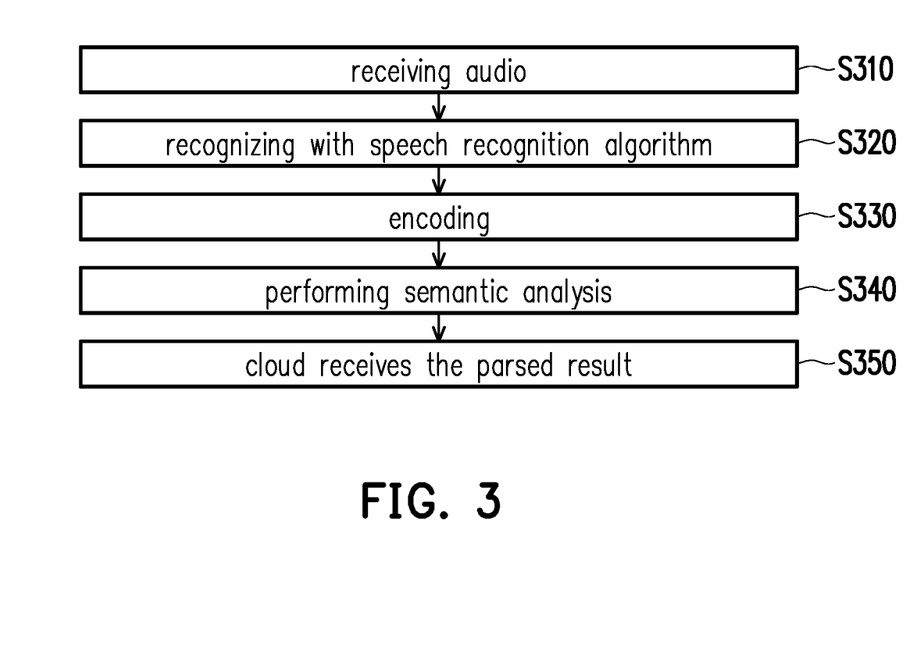
FIG. 3 is a flowchart of an information dissemination method according to an embodiment of the application.

FIG. 3 is a flowchart of an information dissemination method according to an embodiment of the application. Please referring to FIG. 3, Step S310~S340 is performed in the edge device of the information dissemination system (such as smart handheld electronic device or smart speaker). Step S310 is that the smart handheld electronic device or the smart speaker receive the sound signal (audio) of the user. Step S320 and S330 are that the smart handheld electronic device or the smart speaker perform sound signal recognition with the speech recognition algorithm, so as to convert the encoded information content into the text form. Step S340 is that the router performs semantic analysis on the encoded information content, so as to get a parsed result. Step S350 is that the cloud receives and transmits the parsed result, so that at least one speaker broadcasts the encoded information content with synthesized speech, or make at least one speaker broadcasts the corresponding audio according to the parsed result, or make IoT devices perform specific functions based on the parsed results.

Figure 4:
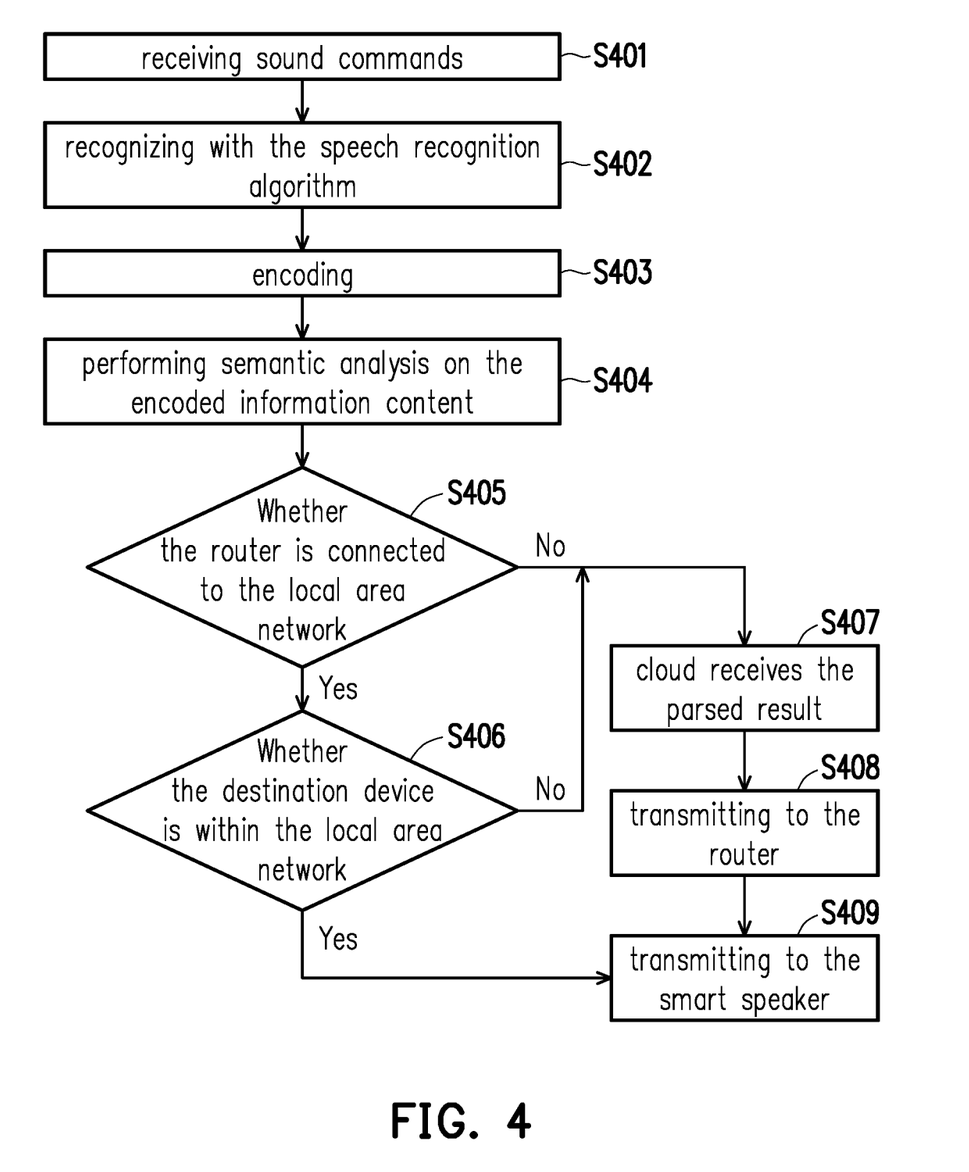
FIG. 4 is a flowchart of an information dissemination method according to an embodiment of the application.

FIG. 4 is a flowchart of an information dissemination method according to an embodiment of the application. Please referring to FIG. 4, Step S401 is that the edge device of the information dissemination system receives the sound signal. Step S402 and Step S403 are to recognize the sound signal according to the speech recognition algorithm and to generate the parsed result including the encoded information content and the address information of the corresponding destination device. Step S404 is that the router performs the semantic analysis on the encoded information content, so as to produce parsed result. Step S405 is that the router determines whether it is connected to the LAN. If yes, then the router further determines whether the destination device is within the scope of the LAN (Step S406). If yes, the parsed result is transmitted to the corresponding smart speaker in the LAN (Step S409). If the result of determination of Step S405 or Step S406 is no, the cloud receives the parsed result (Step S407), and the router which is responsible for another LAN further transmits to the smart speaker located in the aforementioned another LAN (Steps S408 and S409).

Figure 5:
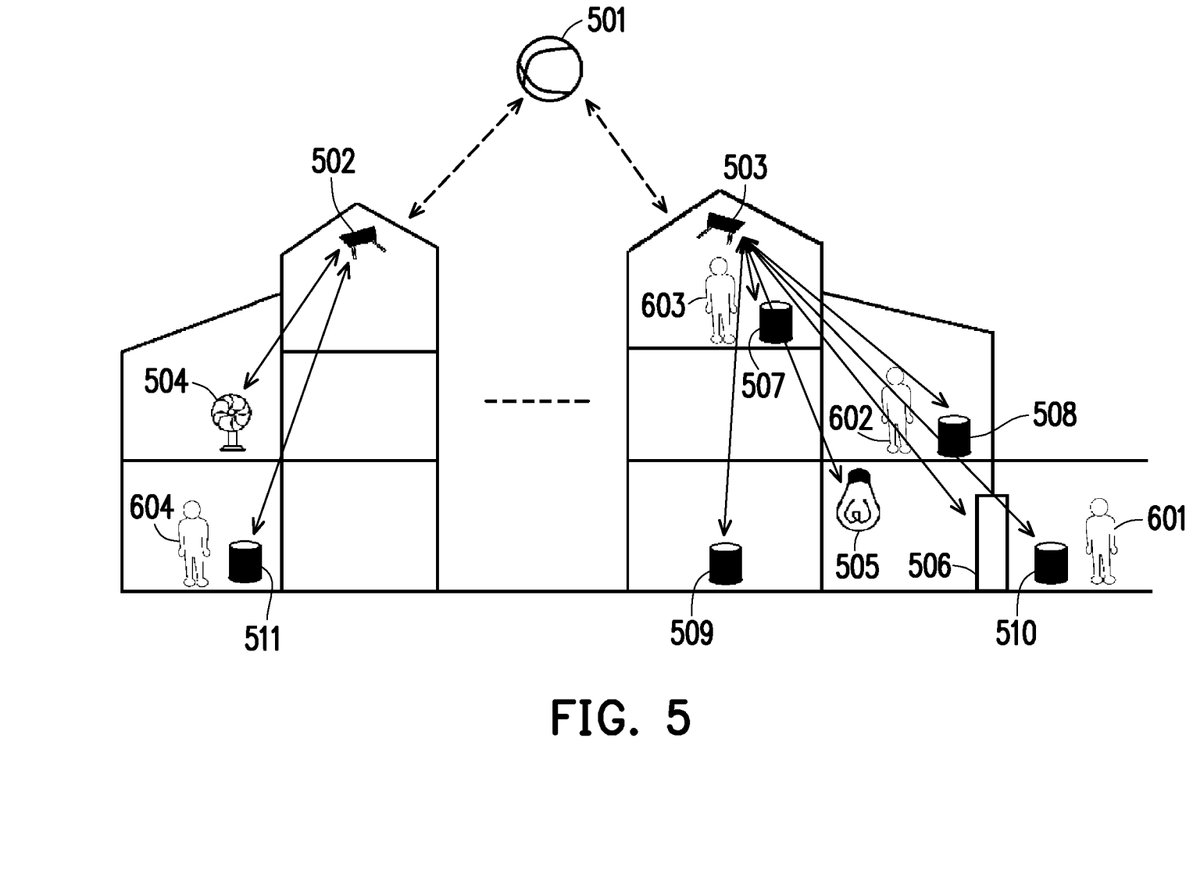
FIG. 5 is a usage scenario diagram of an information dissemination system according to an embodiment of the application.

FIG. 5 is a usage scenario diagram of an information dissemination system according to an embodiment of the application. The information dissemination system may include a cloud 501, a router 502 and 503, a smart air conditioner 504, a smart light 505, a smart door lock 506 and other IoT devices and smart speakers 507-511. In a usage scenario, the user 601 may speak to the smart speaker 510 "I'm back, please open the door", after the smart speaker 510 recognize the sentence, the router 503 further performs the semantic analysis. The router 503 transmits the parsed result to the smart door lock 506, to make the smart door lock 506 unlock. Further, the smart speaker 510 can also turn on the smart light 505 in the living room, and the smart speakers 507-509 is controlled by the router 503 to broadcast "someone has entered" for user 602, 603 know that someone is coming in. In an usage scenario, the user 604 may speak to the smart speaker 511 "please open the air conditioner on the second floor", and after the smart speaker 511 recognizes the sentence as the encoded information content in the text form, the router 502 performs semantic analysis on it, so as to turn on the smart air conditioner 504.

In a usage scenario, user can control the smart speakers 507-511 and the IoT devices (smart air conditioner 504, smart light 505 and smart door lock 506) at home via the smart handheld electronic device (not shown). In a usage scenario, the information dissemination system can be applied to two families. For example, the user 602 transmits information to the user of another family via the smart speaker 508, the router 503, the cloud 501, the router 502, and the smart speaker 511. It should be noted that, the above usage scenarios are all on the edge devices of the information dissemination system (such as smart handheld electronic devices and smart speakers) to complete speech recognition and encoding. The encoded information content may be analyzed by the router, so as to enable the destination device to perform the corresponding action or function according to the parsed result.

The above embodiments describe that the semantic analysis is performed by the router, however, the application is not limited thereto. In other embodiments, the edge devices (smart handheld electronic devices or smart speakers) can recognize sound signals and can also perform semantic analysis.

In summary, the application can perform speech recognition through the edge device of the information dissemination system and perform semantic analysis on the recognition results through the router. The parsed result is transmitted via the router (or cloud). Compared with the prior art which upload the audio to the cloud by streaming, and perform speech recognition and semantic analysis in the cloud, the application has the advantages of fast transmission speed and short cloud processing time. And, the dependence on a stable network of the application is lower than the prior art.

What is claimed is:

1. An information dissemination system, comprising:
    a first electronic device, receiving a first sound signal and recognizing the first sound signal according to a speech recognition algorithm to generate a first address information and a first encoded information content; and
    a router, connected to a local area network to receive the first encoded information content and semantically parse the first encoded information content to produce a parsed result, and the router transmits the parsed result through the local area network,
    wherein the router determines whether a first address indicated by the first address information is in the local area network according to the first address information, so as to send the parsed result to at least one second electronic device corresponding to the first address.

2. The information dissemination system according to claim 1, wherein the at least one second electronic device receives the parsed result to perform synthetic speech processing on a text information of the parsed result and broadcast it.

3. The information dissemination system according to claim 2, wherein the at least one second electronic device is a plurality of sound playback devices, and the plurality of sound playback devices receive the parsed result and play the text information processed by synthetic speech processing simultaneously.

4. The information dissemination system according to claim 1, wherein the at least one second electronic device searches for a corresponding second sound signal according to the parsed result and broadcasts it.

5. The information dissemination system according to claim 1, wherein the at least one second electronic device perform a corresponding first function according to the parsed result.

6. The information dissemination system according to claim 1, wherein the first electronic device is further configured to recognize the first speech signal according to the speech recognition algorithm to generate a second address information, and the router determines whether a second address indicated by the second address information is in the local area network, so as to transmit the parsed result to a third electronic device corresponding to the second address.

7. The information dissemination system according to claim 1, wherein the first electronic device is a handheld communication device or a sound player.

8. The information dissemination system according to claim 1, wherein the at least one second electronic device is a sound player or a processing device.

9. The information dissemination system according to claim 1, wherein the router performs semantic analysis with a natural language processing on the first encoded information content to generate the parsed result.

10. An information dissemination system, comprising:
    a first electronic device, receiving a first sound signal and recognizing the first sound signal according to a speech recognition algorithm to generate a first address information and a first encoded information content; and
    a router, receiving the first encoded information and semantically parse the first encoded information content to produce a parsed result, and the router transmits the parsed result through a cloud system,
    wherein the router is connected to a local area network, and the router determines whether a first address indicated by the first address information is beyond the scope of the local area network according to the first address information, and transmits the parsed result to the at least one second electronic device corresponding to the first address through the cloud system.

11. The information dissemination system according to claim 10, wherein the at least one second electronic device receives the parsed result from the cloud system to perform synthetic speech processing on a text information of the parsed result and broadcast it.

12. The information dissemination system according to claim 11, wherein the at least one second electronic device is a plurality of sound playback devices, and the plurality of sound playback devices receive the parsed result and play the text information processed by synthetic speech processing simultaneously.

13. The information dissemination system according to claim 10, wherein the at least one second electronic device searches for a corresponding second sound signal according to the parsed result and broadcasts it.

14. The information dissemination system according to claim 10, wherein the at least one second electronic device performs a corresponding first function according to the parsed result.

15. The information dissemination system according to claim 10, wherein the first electronic device is further configured to recognize the first speech signal according to the speech recognition algorithm to generate a second address information, and the router determine whether a second address indicated by the second address information is beyond the scope of the local area network, so as to transmit the parsed result to a third electronic device corresponding to the second address.

16. The information dissemination system according to claim 10, wherein the first electronic device is a handheld communication device or a sound player.

17. The information dissemination system according to claim 10, wherein the at least one second electronic device is a sound player or a processing device.

18. The information dissemination system according to claim 10, wherein the router performs semantic analysis with a natural language processing on the first encoded information content to generate the parsed result.

19. An information dissemination method, comprising:
receiving a first sound signal by a first electronic device connected to a local area network and recognizing the first sound signal according to a speech recognition algorithm to generate a first address information and a first encoded information content; and
receiving the first encoded information content and semantically parse the first encoded information content to produce a parsed result by a router connected to the local area network and transmitting the parsed result through the local area network by the router,
wherein the router determines whether a first address indicated by the first address information is in the local area network according to the first address information,
wherein when the router determines that the first address indicated by the first address information is in the local area network, so as to send the parsed result to at least one second electronic device corresponding to the first address.

20. The information dissemination method according to claim 19, wherein when the router determines the first address indicated by the first address information is beyond the scope of the local area network, so as to transmit the parsed result to a third electronic device corresponding to the first address through a cloud system.

* * * * *